United States Patent [19]

Kawamoto

[11] 4,324,150
[45] Apr. 13, 1982

[54] MECHANISM FOR PREVENTING MISSELECTION OF REVERSE GEAR

[75] Inventor: Tamio Kawamoto, Sagamihara, Japan

[73] Assignee: Nissan Motor Co., Ltd., Yokohama, Japan

[21] Appl. No.: 114,603

[22] Filed: Jan. 23, 1980

[30] Foreign Application Priority Data

Jan. 30, 1979 [JP] Japan .................................. 54/9869

[51] Int. Cl.³ ............................................ F16H 57/06
[52] U.S. Cl. .................................................... 74/476
[58] Field of Search ......................................... 74/476

[56] References Cited

U.S. PATENT DOCUMENTS 3,939,724  2/1976  Takahashi ............................. 74/476
4,018,099  4/1977  O'Brien et al. .................... 74/476 X

FOREIGN PATENT DOCUMENTS 1406795  9/1975  United Kingdom .
1446337  8/1976  United Kingdom .
1449411  9/1976  United Kingdom .
1464457  2/1977  United Kingdom .

Primary Examiner—Allan D. Herrmann
Attorney, Agent, or Firm—Thompson, Birch, Gauthier & Samuels

[57] ABSTRACT

A mechanism for preventing unintended selection of reverse gear in a manual transmission of a vehicle comprising a plug assembly having a cam mechanism mounted at the base end portion of the control lever of the transmission. The cam mechanism allows the control lever to move freely to a forward drive gear shift position but restricts its direct linear movement from the forward drive gear shift position to the reverse gear shift position.

3 Claims, 28 Drawing Figures

MECHANISM FOR PREVENTING MISSELECTION OF REVERSE GEAR

BACKGROUND OF THE INVENTION

The present invention relates to a mechanism for preventing unintended selection of a reverse gear in a manual transmission of a vehicle.

The invention specifically relates to a manual transmission in which the selection of speed ranges or the shifting of gear ratios is effected by the operation of a control lever to rotate or to shift the fork rod axially. In such a transmission, having its shift pattern such that the reverse gear shift position is aligned on a linear shift line of the control lever with a forward gear shift position, it is possible to unintentionally select the reverse position erroneously during the select or shift operation from the forward gear shift position to another forward gear shift position. In such erroneous gear selection of the reverse gear position it is obvious that a large noise of gear coupling occurs and in some case breakdown of the gear system may result.

A mechanism for preventing misselection of the reverse gear position is known. One example of a prior art device is shown in FIG. 1. The mechanism comprises a circular plate 51 having a hole 51a through which the lower end of the control lever 50 is extended. A cam 54 is pivotally mounted on a pin 52 secured to the plate 51 with an intervention of a coil spring 53. This circular plate 51 is mounted on the housing 55 after passing around the control lever 50 and is fixed in position by means of a cap 56. The operation of this mechanism can better be seen from FIG. 2. In FIG. 2, 1st, 2nd, 3rd, 4th and 5th show the position of the control lever in the respective forward steps and R shows the reverse position. When a driver wishes to operate the control lever 50 to downshift from the forward 5th speed range, the control lever 50 abuts against an end 54a of the cam 54 so that the cam 54 rotates counterclockwisely as shown in the drawing and the other end 54b comes in contact with the housing 55 as indicated by the double dotted line. By this means a linear shift operation of the control lever 50 is prevented and the possible misselection of the reverse gear shift position is avoided. However, the assembling of this mechanism is troublesome since the circular plate 51 must be mounted onto the housing 55 after inserting the control lever through its hole 51a and thereafter the circular plate must be fixed by a cap 56 and thereafter a control lever boot not shown in the drawing must be applied thereon. The disassembling of the same mechanism is also troublesome. Therefore, this mechanism increases the cost in manufacturing a vehicle.

SUMMARY OF THE INVENTION

The present invention has for its object the provision of a a reverse gear selection preventing mechanism having a simple construction for easy assembly. The invention is to realize a sub-assembled mechanism of the abovementioned kind.

In accordance with the present invention, the above object can be achieved by providing a cam on a plug mounted at the side of a base mount portion of a control lever in the extension. The cam allows free movement of the control lever in a shift operation from a reverse gear shift position to a forward running gear shift position. The cam restricts the movement of the control lever in a shift operation from a forward running gear shift position to the reverse gear shift position on a linear movement of the lever by limiting its own rotation and the cam guides the control lever to return to the neutral position.

BRIEF EXPLANATION OF THE DRAWINGS

FIGS. 8A, 8B, 8C to FIGS. 14A, 14B, 14C are schematic views for explaining operation of the mechanism of the present invention.

DESCRIPTION OF A PREFERRED EMBODIMENT

The invention will now be described by referring to the accompanying drawings.

Figure 1:
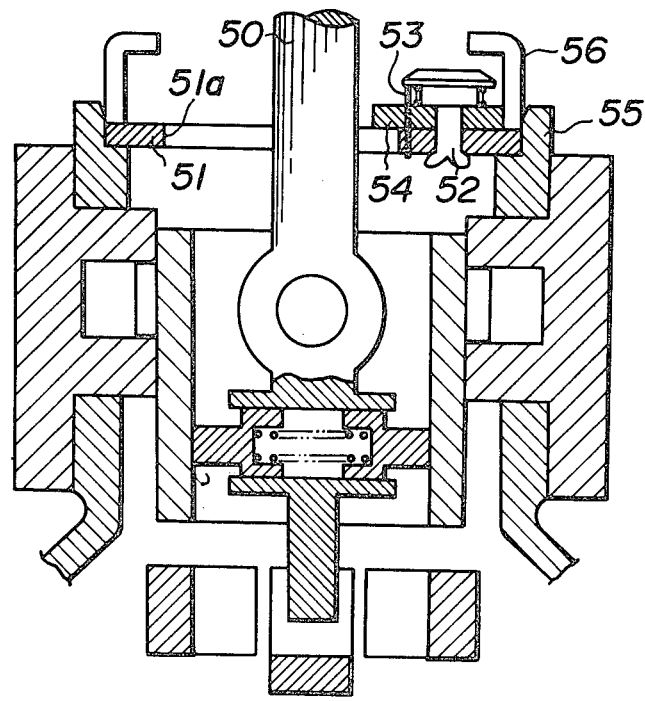
FIG. 1 is an explanatory view for showing a conventional control lever mounting portion equipped with a reverse gear selection preventing mechanism as mentioned above.
Figure 2:
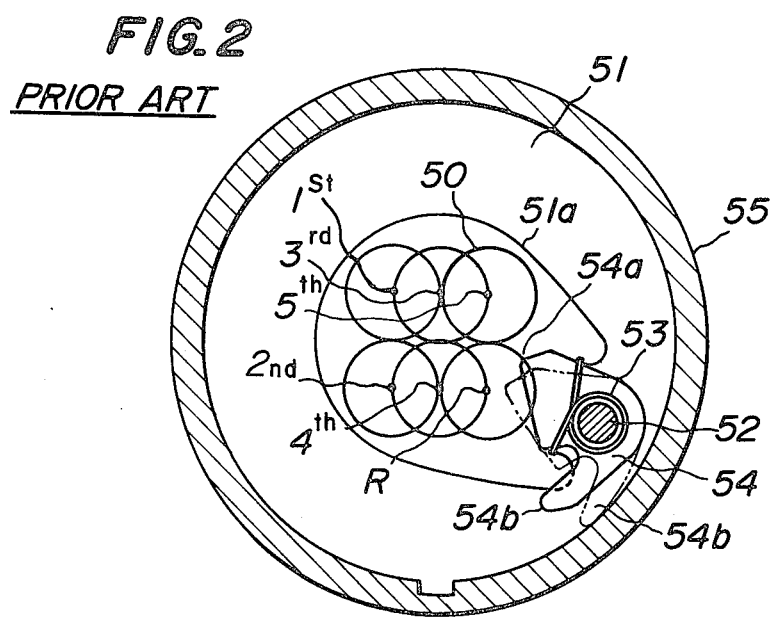
FIG. 2 is a view for explaining an operation of the mechanism shown in FIG. 1 as mentioned above.
Figure 3:
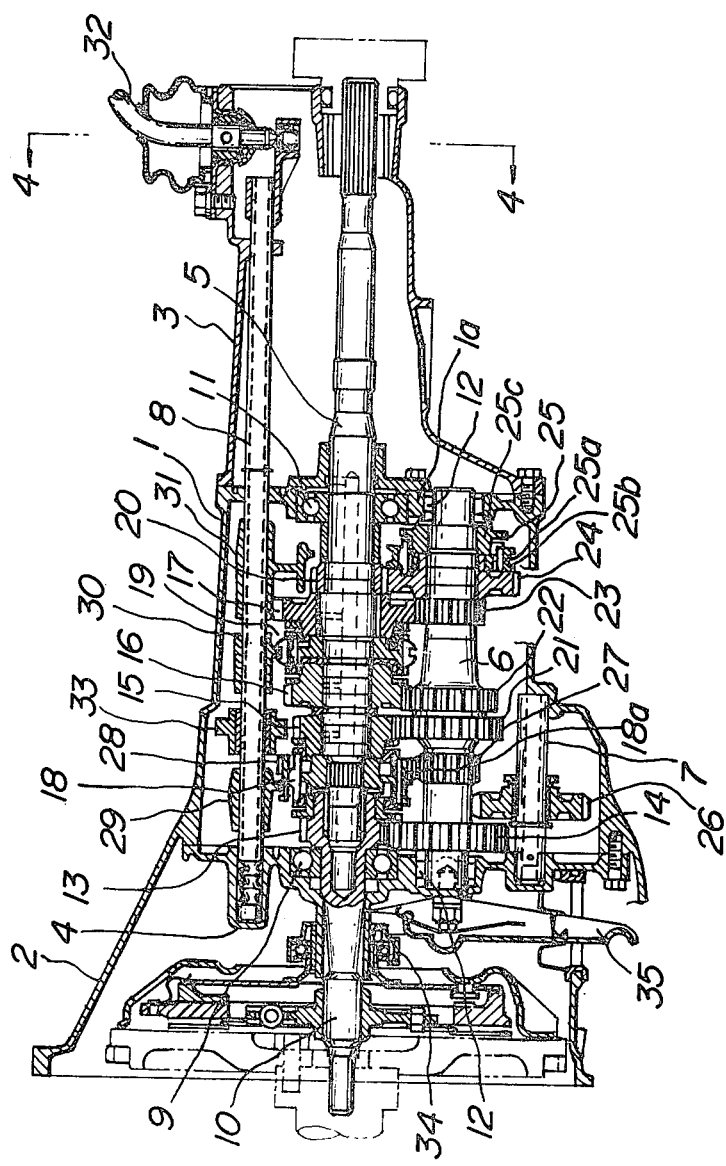
FIG. 3 is a vertical cross-sectional view of a transmission to which the present invention is applied.

FIG. 3 shows a cross-sectional view of a transmission of a vehicle in which the present invention is incorporated. In FIG. 3, reference numeral 1 designates a clutch housing, 2 is a transmission case formed integrally, 3 is an extension formed separately from the transmission case 2 and secured by screws on the rear end thereof, and 4 is a front cover mounted on the front surface of the transmission case 2. The aforementioned transmission case 1, the extension 3 and the front cover 4 form a gear housing altogether. In the gear housing, a main shaft 5, a counter shaft 6, an idle shaft 7 and a fork rod 8 are positioned in parallel longitudinally.

Front end of the main shaft 5 is axially journaled freely rotatably in a hollow rear end of a main drive shaft 10 supported by the front cover 4 in which is mounted a bearing 9. The main shaft 5 is supported near the middle thereof by a rear end wall of the transmission case 2 by means of a bearing 11, and rear end of the main shaft 5 is arranged to extend at a rear end position of the extension 3. The counter shaft 6 is supported at its front end by the front cover 4 and at its rear end by the rear end wall 1a of the transmission case 2 in which are mounted bearings 12 and 12. The idle shaft 7 is fixed at its both ends by the front cover 4 and a part of the transmission case 2. The fork rod 8 is extended between the transmission case 2 and the extension 3 to allow rotation about the axis and movement along the axis.

The main drive shaft 10 is rotatably driven by the engine via a clutch not shown in the drawing. The rotational force is conveyed to the counter shaft 6 via a main drive gear 13 provided at the main drive shaft rear end and a counter gear 14 meshing therewith. The main shaft 5 carries a third speed gear 15, a second speed gear 16 and a first speed gear 17 in that order from the front end of the shaft to rotate freely. There are also mounted on the main shaft 5, synchronizers 18 and 19 between the main drive gear 13 and the third speed gear 15 and between the second speed gear 16 and the first speed gear 17, respectively. Furthermore, an overdrive gear 20 is provided at the adjacent rear side of the first speed gear 17.

The aforementioned counter shaft 6 comprises a third gear 21, a second gear 22 and a first gear 23 formed integrally and which mesh with the respective speed gears 15, 16 and 17. At rear end side of the first gear 23, an OD gear 24 meshing with said overdrive gear 20 is mounted to freely rotate and a synchronizer 25 is provided adjacent thereto. This synchronizer 25 has a synchor-hub 25a spline coupling with the OD gear 24 so as to allow rotation of a coupling sleeve 25b about the shaft 6 and a clutch 25c spline coupled with the shaft 6 to rotate with said shaft.

On the aforementioned idle shaft 7, a reverse idle gear 26 is mounted to freely rotate and allow movement in the axial direction. When the reverse idle gear 26 is moved rightwardly from the position indicated, it meshes with both the R gear 27 formed integrally with the counter shaft 6 and at the same time with a reverse gear 28 formed on the periphery of the coupling sleeve 18a of the synchronizer.

The fork rod 8 further comprises forks 29, 30, 31 on the boss portion to rotate freely to match the position of the synchronizers 18, 19 and 25. The end portions of these forks 29, 30 and 31 are arranged in parallel about the axis of the fork rod 8. When the fork rod 8 is rotated about its axis by the control lever 32, a shifter 33 formed integrally with the rod 8 selects one of the forks and the selected fork is moved axially at the same time as the axial movement of the fork rod 8. An end of a lever not shown in the drawing but which is pivoted on the casing is arranged to abut with the aforementioned reverse idle gear 26. Another end of the lever is arranged to extend in parallel with the fork rods. At the time of reverse running selection, this lever is swung by the shifter to move the reverse idle gear axially.

In the drawing, reference number 34 designates a throwout bearing and 35 is a withdrawal lever.

Figure 4:
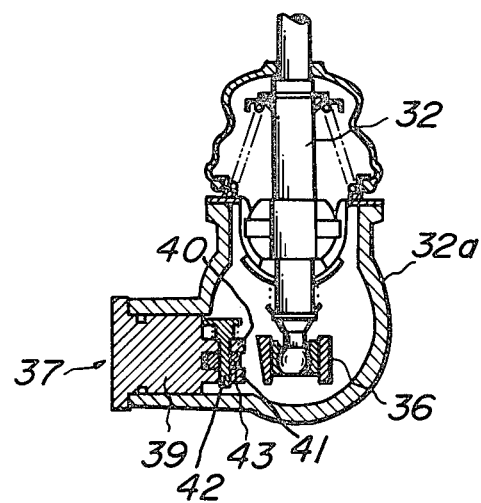
FIG. 4 is a cross-sectional view along line 4—4 of FIG. 3.
Figure 5:
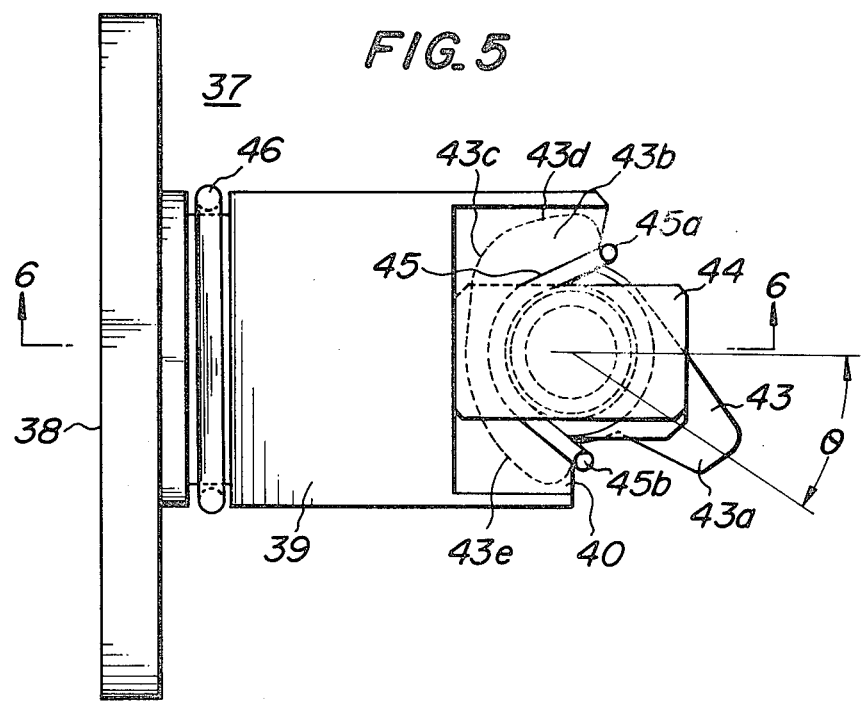
FIG. 5 is a plan view of the reverse selection preventing mechanism according to the present invention.
Figure 6:
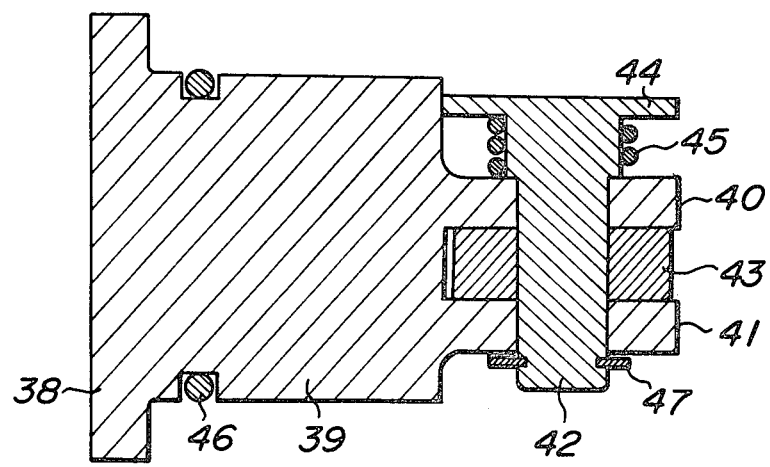
FIG. 6 is a cross-sectional view along line 6—6 of FIG. 5.
Figure 7:
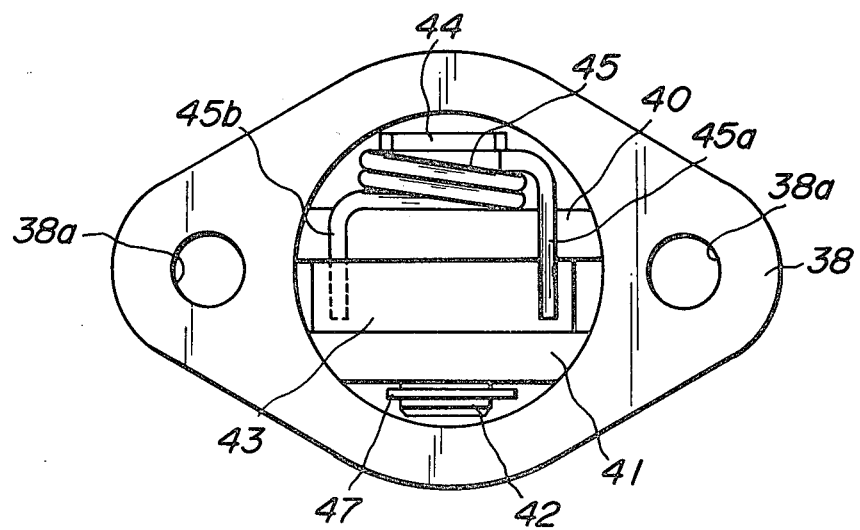
FIG. 7 is a front view of the mechanism shown in FIG. 5.

The control lever 32 and the fork rod 8 are coupled by a connecting piece 36. Further a plug shaped reverse gear misselection preventing mechanism 37 is mounted in the proximity of the base mounting portion 32a of the control lever 32 as shown in the cross-section of FIG. 4. The details of the reverse gear misselection preventing mechanism 37 are shown in FIGS. 5 to 7. The mechanism comprises a plug 39 as the basic element. The plug 39 has a flange 38. The flange 38 is secured in the mounting portion 32a by screws or the like to form an assembled unit. Two parallel extending side support plates 40 and 41 are shaped by machining at the top of the plug 39. A cam 43 is journaled to rotate freely between said side support plates 40 and 41 by a pin 42. On the top end of the pin 42 a flange 44 is provided to extend laterally as can be better seen from FIG. 6. The flange 44 has a parallelepiped shape as shown in FIG. 5. One end edge of the flange 44 is maintained in contact with an end surface of the plug 39 so as to prevent the pin 42 from rotating about its axis. At the lower side of the pin 42, a securing C-shaped ring 47 is coupled in order to prevent the pin 42 from being axially removed.

The cam 43 is shaped to have a flat form as can be seen from FIGS. 5 and 6. At one end of the cam 43, a projecting piece 43a is provided and at the other end of the same or the base end of the cam 43, a wide width portion 43b is formed. The wide width portion 43b comprises a rotation limiting or flat portion 43c at the side facing the end surface of the plug 39. At both sides of the flat portion 43c, there are provided curved portions 43d and 43e. A spiral coil spring 45 is mounted on the pin 42 biased between said side support plate 40 and the flange 44 of the pin 42. One end 45a of the spring 45 is engaged at a shoulder portion of the cam 43 between the projecting piece 43a and the wide width portion 43b at the side of the curved portion 43d. The other end 45b of the spring 45 is engaged on a shoulder portion at the side of the curved portion 43e of the cam 43. When the control lever 32 is in the neutral position, the projecting piece 43a of the cam 43 is positioned at a location forming a certain angle $\theta$ relative to the axial direction of the plug 39 as shown in FIG. 5 by the force of the spiral spring 45. In this position, the rotation limiting or flat portion 43c is separated from the end edge of the plug 39. The above angle $\theta$ may preferably be 30°. The size and shape and positioning of the projection of the projecting piece 43a is selected to properly interact with the base end of the control lever 32. The surfaces of the shoulder portions of the arm 43 onto which the ends 45a and 45b of the spring 45 are engaged are arranged to substantially correspond to the side surfaces of the side support plate 40 so that the spring 45 bears on the side support plate 40 when the cam 43 rotates even slightly in either direction.

Reference numeral 46 designates an "O" ring. The flange 38 is provided with bolt holes 38a for mounting.

Operation of the abovementioned embodiment of the present invention will now be described.

Figure 8A:
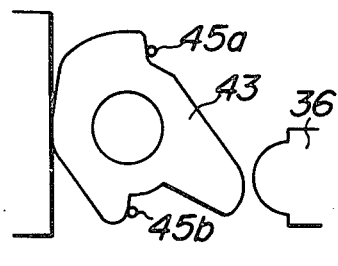
Figure 8B:
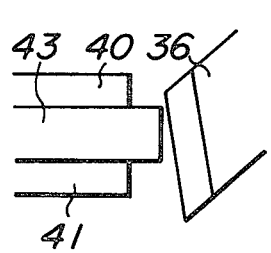
Figure 8C:
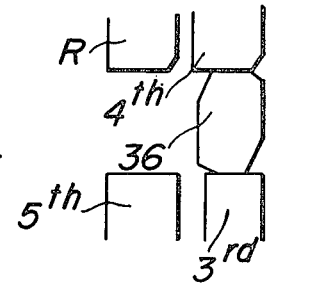
Figure 9A:
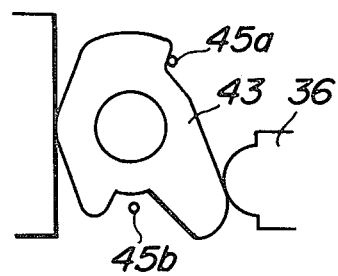
Figure 9B:
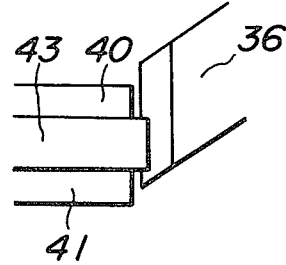
Figure 9C:
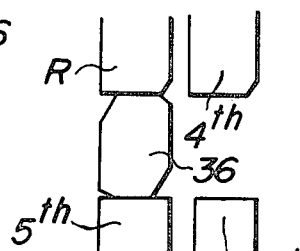
Figure 10A:
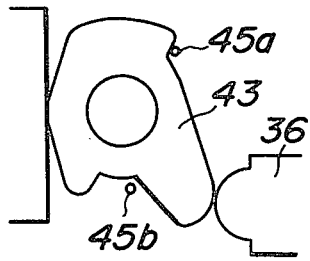
Figure 10B:
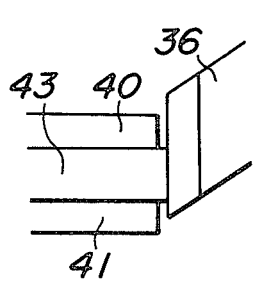
Figure 10C:
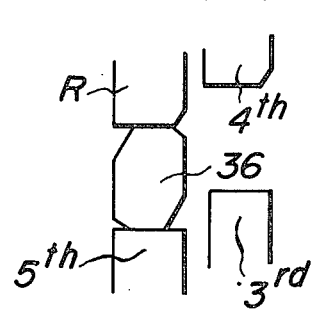
Figure 11A:
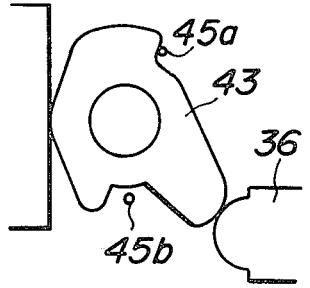
Figure 11B:
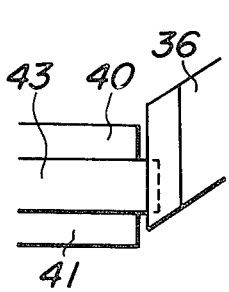
Figure 11C:
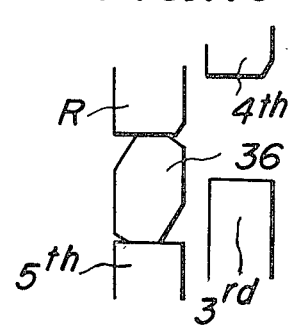
Figure 12A:
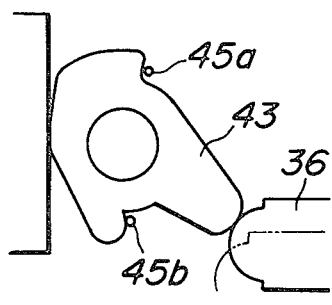
Figure 12B:
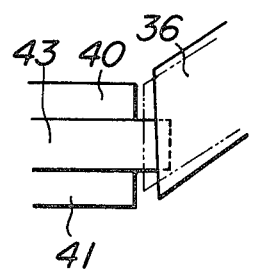
Figure 12C:
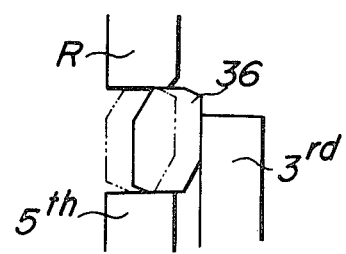
Figure 13A:
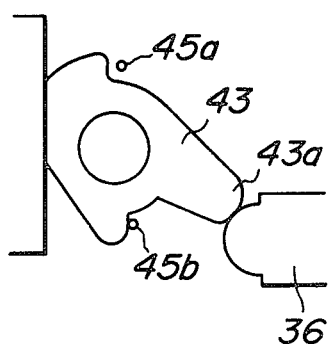
Figure 13B:
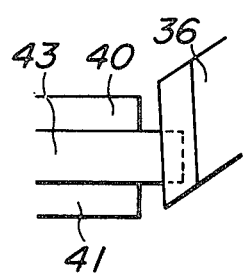
Figure 13C:
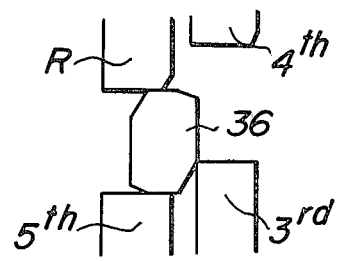

At the neutral position of the control lever 32, the control lever 32 is located at a position in which its connecting piece 36 is not in contact with the projecting piece 43a of the cam 43 as shown in FIGS. 8A to 8C. If the control lever 32 is operated to select the 5th speed range, the base end of the control rod 32 represented by the connecting piece 36 comes in contact with the projecting piece 43a of the cam 43 so that the cam 43 slightly rotates clockwisely as shown in FIGS. 9A to 9C. If the shifting operation of the control lever 32 is continued, the cam 43 is rotated clockwisely to the maximum rotating angle as shown in FIGS. 10A to 10C. Then the base end of the control lever 32 overrides the projecting piece 43a of the cam 43 so that the cam 43 releases to the original neutral position by the bias force of the coil spring 45 as shown in FIGS. 11A to 11C. With the cam in this neutral position, the shifting to the 5th speed range continues until completed.

Figure 14A:
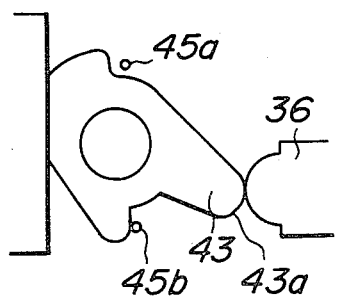
Figure 14B:
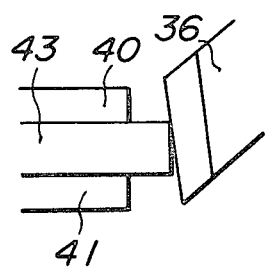
Figure 14C:
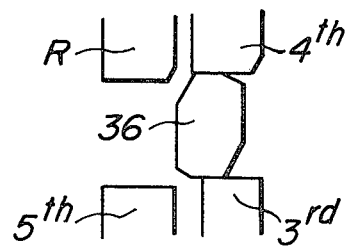

If a downshift to the 4th speed range is desired, the control lever 32 is shifted to the return to its original position thereby rotating the cam 43 in counter-clockwise direction as shown in FIGS. 12A to 12C and FIGS. 13A to 13C. However, the rotation limiting or flat portion 43c of the cam 43 abuts the end surface of the plug 39 so that the rotation of the cam 43 is restricted. Accordingly, the control lever 32 is guided by the projecting piece 43a to move toward the neutral position as shown in FIGS. 14A to 14C. By this action a misshift to put the control lever in the reverse gear shift position is prevented.

It is obvious that a shift from the neutral position to the reverse position or vice versa is possible without any restriction as in a conventional system.

As can be understood from the foregoing explanation according to the present invention, a cam is provided on a plug mounted on the side surface of a mounting portion 32a of the control lever 32. The cam is arranged to permit a free shift of the control lever from the reverse gear shift position to the forward gear position but is restricted in its rotation to prevent the shifting from one forward running position to the reverse gear shift position on an identical linear control line of the control lever. This cam restriction causes the control lever to move to its neutral position guided by the cam. By introducing this mechanism of the present invention, the whole mechanism may be subassembled on the plug and by securing the plug onto the mounting portion of the control lever, the assembling of the mechanism can be completed so that easy assembling of the mechanism is realized by a very simple construction. The device contributes greatly to decreasing the manufacturing cost of a vehicle.

Although a particular embodiment has been explained, various modifications may be possible without departing from the scope of the claims.

What is claimed is:

1. A mechanism for preventing a control lever from misselecting reverse gear in a transmission in which a forward running gear shift position is aligned on a same shift control line with a reverse gear shift position of the control lever, an improvement comprising a plug arranged at a mounting portion of the control lever, and a cam pivotally supported by a pin to freely rotate on supporting plates projecting from the top and of said plug and having a coil spring pivoted on said pin so as to urge a projecting portion of the cam against an end portion of the control lever, the cam further provided with a rotation limiting portion at an end remote from the projecting portion, wherein when the control lever is moved from a forward running gear shift position said cam is rotated by the control lever to cause said rotation limiting portion to abut against said plug in order to prevent the control lever from being put into the reverse gear shift position by moving on a linear shift control line.

2. A mechanism as claimed in claim 1, wherein the cam is provided between said supporting plates of said plug, and the coil spring is arranged to extend between a flange of said pin and the supporting plates of said plug.

3. A mechanism for preventing the control lever of a manual transmission from being shifted on a direct operational line from a forward running gear shift position to the reverse gear shift position, the transmission including a rotatable and axially movable fork rod, the control lever being operably connected to the fork rod causing the fork rod to move into different gear shift positions, the improvement to the preventing mechanism comprising: a cam supported by a stationary portion of the transmission and biased by a spring such that the cam is freely rotated in one direction by action of the fork rod against the force of the spring permitting axial movement of the fork rod from the neutral gear shift position into a forward or reverse gear shift position, the cam being restricted in its rotation in the other direction thereby preventing axial movement of the fork rod from said forward gear shift position directly into the reverse gear shift position and instead guiding and constraining the axial movement of the fork rod from said forward gear shift position to the neutral gear shift position, said transmission stationary portion including a plug in which the cam and spring are mounted to form a unitary assembly, said assembly adapted to be inserted into and removed from the rear end of the transmission case without touching the control lever or requiring movement of the control lever.

* * * * *

UNITED STATES PATENT AND TRADEMARK OFFICE
CERTIFICATE OF CORRECTION

PATENT NO. : 4,324,150

DATED : April 13, 1982

INVENTOR(S) : Tamio Kawamoto

It is certified that error appears in the above–identified patent and that said Letters Patent are hereby corrected as shown below:

Claim 1, column 5, line 26, delete "and" and insert --end--.

Signed and Sealed this

Twenty-ninth Day of June 1982

[SEAL]

Attest:

GERALD J. MOSSINGHOFF

Attesting Officer  Commissioner of Patents and Trademarks